Figures 1, 1A:
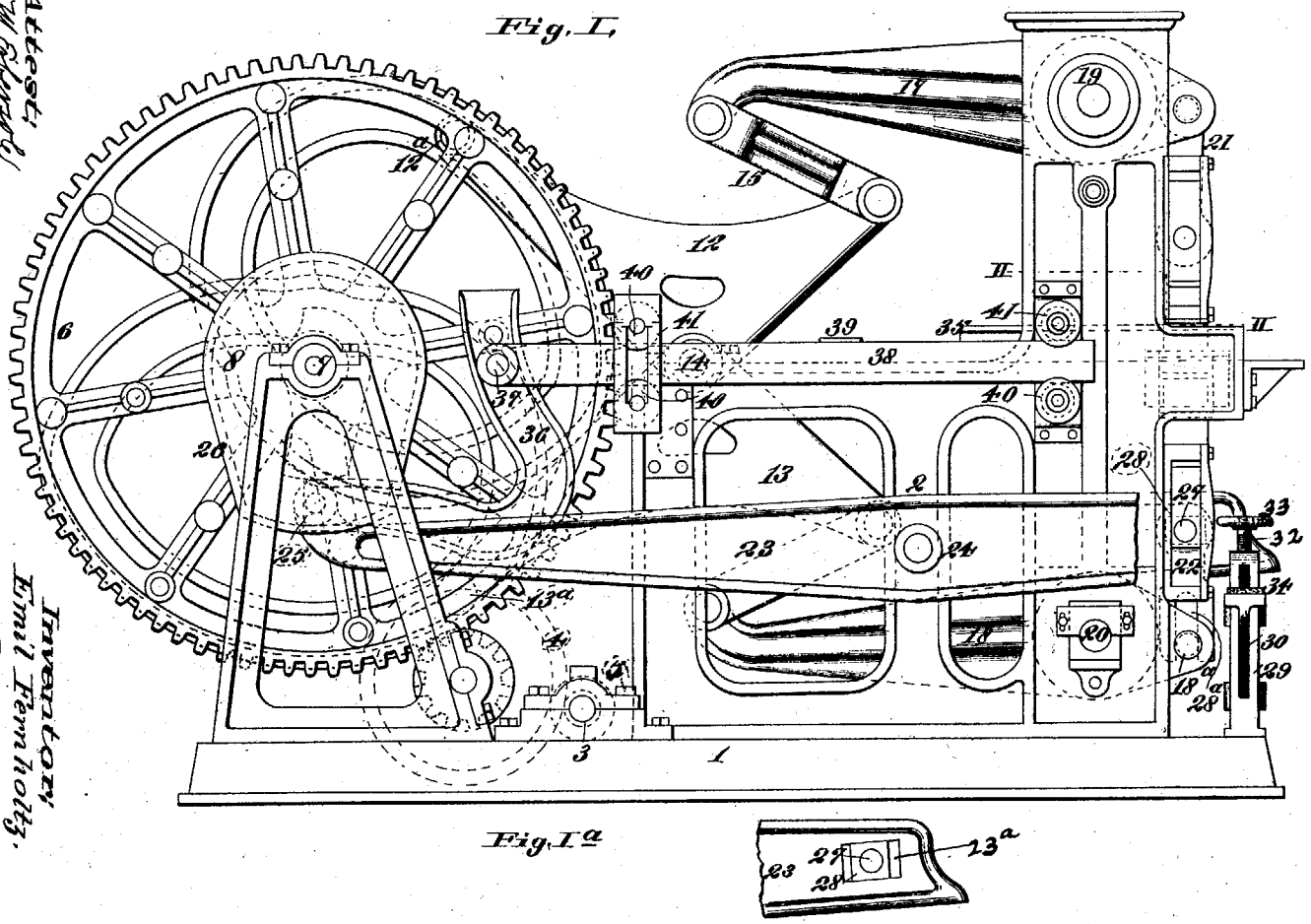

2 Sheets—Sheet 1.

E. FERNHOLTZ.

BRICK MACHINE.

No. 11,472. Reissued Feb. 19, 1895.

Attest:
A. M. Oberwolf
C. G. Edwards.

Inventor:
Emil Fernholtz.
By Knight Bros
Atty's

THE NORRIS PETERS CO., PHOTO-LITHO., WASHINGTON, D. C.

2 Sheets—Sheet 2.
E. FERNHOLTZ.
BRICK MACHINE.
No. 11,472. Reissued Feb. 19, 1895.
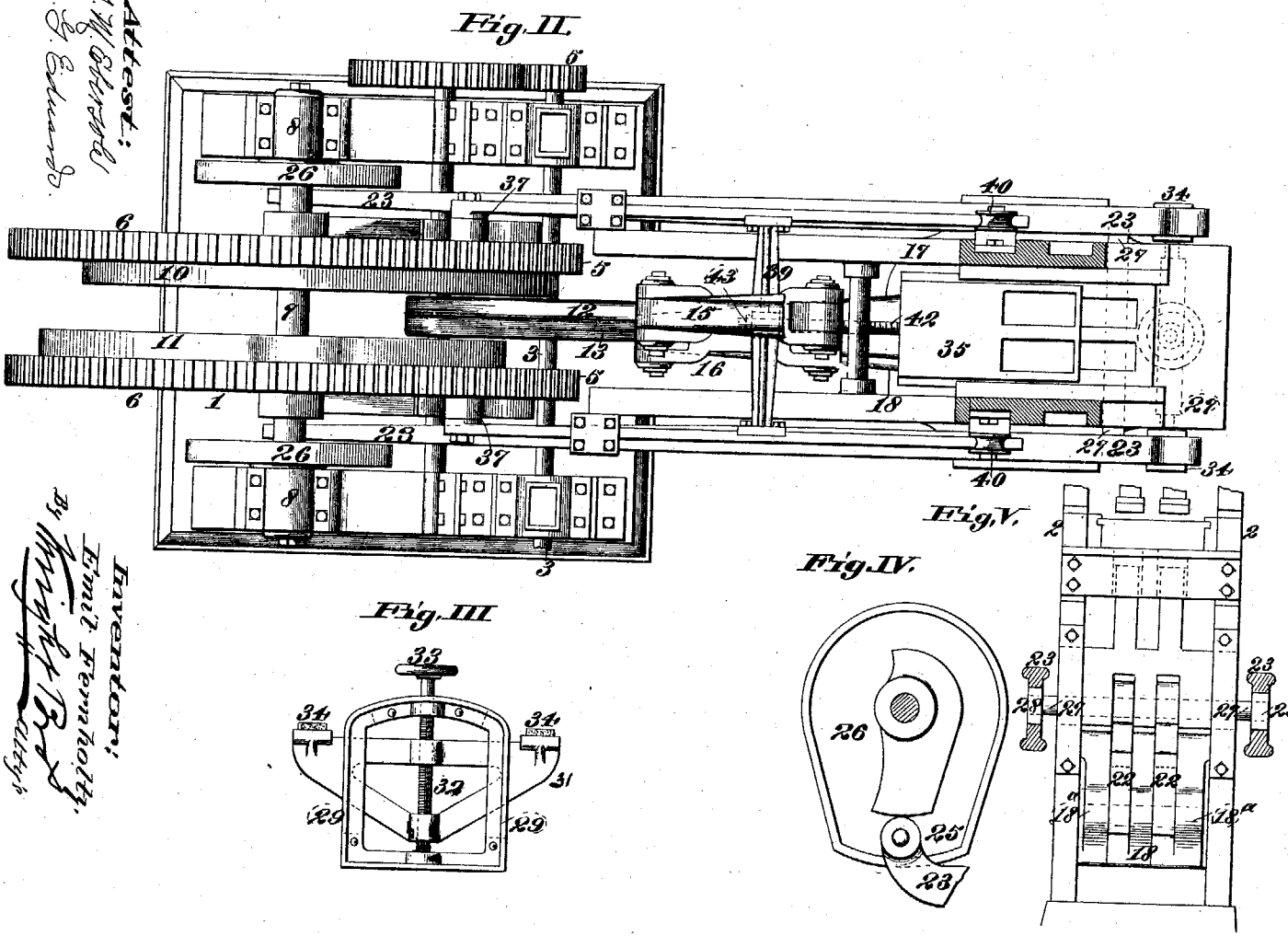
Attest:
A. W. Eberstein
C. G. Eduardo.
Inventor:
Emil Fernholtz,
By Wright Brown & Quinby Atty's
THE NORRIS PETERS CO., PHOTO-LITHO., WASHINGTON, D. C.

UNITED STATES PATENT OFFICE.

EMIL FERNHOLTZ, OF ST. LOUIS, MISSOURI, ASSIGNOR OF ONE-HALF TO JACOB STOCKE AND HENRY C. BECKMANN, OF SAME PLACE.

BRICK-MACHINE.

SPECIFICATION forming part of Reissued Letters Patent No. 11,472, dated February 19, 1895.

Original No. 509,302, dated November 21, 1893. Application for reissue filed December 15, 1893. Serial No. 494,013.

*To all whom it may concern:*

Be it known that I, EMIL FERNHOLTZ, of the city of St. Louis, in the State of Missouri, have invented a certain new and useful Improvement in Brick-Machines, of which the following is a full, clear, and exact description, reference being had to the accompanying drawings, forming part of this specification.

My invention relates to a brick machine of the class employing a stationary mold, and upper and lower plungers, between which the brick is pressed in the mold, and my invention consists in features of novelty in the machine, as will be hereinafter fully described and pointed out in the claims.

Figure I is a side elevation, illustrating the parts of the machine in the positions assumed at the time of the discharge of the brick or bricks from the mold. Fig. I[a] is a detail view of the forward end of the brick discharger operating lever. Fig. II is a plan or top view, with a part shown in horizontal section, taken on line II—II, Fig. I. Fig. III is a detail front elevation of the brick discharger lever rest or support. Fig. IV is an inside elevation of the operating cam of the brick discharger lever. Fig. V is a detail, front view, with the lifting levers in section.

Referring to the drawings, 1 represents the base, and 2 the frame of the machine, which may be of any desired suitable construction.

3 is the drive shaft driven by a driving pulley (not shown) and 5 are spur-wheels on the shaft 3 from which power is transmitted to the master-wheels 6, carried by shaft 7, turning in bearings 8, through the medium of pinions mounted on shafts intermediate of the spur-wheels 5 and the said master-wheels 6.

On the two master-wheels 6 are cams 10 and 11, the wheels being so mounted on their shaft that the cams are at opposite sides of the wheels, as plainly shown in Fig. I.

12 and 13 are levers fulcrumed at 14, on the respective rear ends of which are rollers 12[a] and 13[a], that move and work in the cams 10 and 11, and connected to the levers 12 and 13 through links 15 and 16, are levers 17 and 18 fulcrumed in the frame at 19 and 20 respectively; to the forward ends of which levers 17 and 18 are connected the upper and lower plunger carrying links 21 and 22.

The cams 10 and 11 are so arranged on the master-wheels that, during the period the brick is being pressed, power is applied to the levers 12 and 13 at the time that the rollers carried by these levers are moving in the portions of the cams nearest the center of the master-wheel, by which means the greatest amount of power is obtained when needed to accomplish the pressing of the brick, and thus the amount of power may be proportionately increased in accordance with the size of master-wheel employed, and the cams be so constructed as to keep the pressure on the brick as long as desired, or to cause the plungers to move as rapidly or as slowly as desired to and from the mold.

For the purpose of raising the bricks from the mold, I employ levers 23, fulcrumed to the frame at 24, the rear ends of which are provided with rollers 25 that move in cams 26, carried by the shaft 7. The forward ends of the levers 23 are connected by means of a rod 27 to the lower plunger carrying links 22, the ends of the rod fitting in boxes 28, fitting in openings 23[a] in the ends of the levers 23. The openings 23[a] allow a limited movement of the boxes lengthwise of the levers 23, as the levers move on their pivots 24. The lever 18 is provided with a pin 18[a], that passes through vertical, elongated slots 28[a] in the links 22, (see Fig. I,) the pin 18[a] bearing against the upper ends of the slots 28[a] during the pressing of the bricks. The slots 28[a] are provided in order that the links 22 may be lifted with the lower plunger by the levers 23 to raise the bricks up out of the mold after they are formed, from where they are moved by the charger on its forward movement. The slots 28[a] thus permit the levers 23 to lift the lower plunger with the links 22, without being interfered with by the lever 18.

29 is a frame located beneath the forward end of the levers 23. It is provided with slots 30, in which a frame 31 has vertical movement, the frame being capable of being raised and lowered by a screw 32, operated by a hand wheel 33.

34 are elastic buffers on the frame 31, for arresting the downward movement of the levers 23, and the lower plunger, without jar or shock, upon their return after lifting the bricks from the mold.

It is quite frequently found necessary to alter the depth of the mold, owing to whether the clay employed is dry or damp, and it is for this purpose that I employ the movable frame 31, which is raised or lowered, when desired, through the medium of the screw 32, to limit the downward movement of the levers 23, and consequently the downward movement of the lower plunger, and its links 22, the links and lower plunger being connected together, as shown in Fig. V, by means of the pin or shaft 27.

By arranging a stop for the lower plunger and the levers 23, forward of the plunger, less strain is brought upon the stop than there is where the stop is arranged directly beneath the plunger, for it is evident that the pressure will be partly taken up by the pivot 24, and be distributed between the pivot 24 and the stop, the stop receiving a proportionate amount of the pressure according to its distance from a vertical line drawn through the plunger.

By providing the fixed and movable frames 29 and 31, a very easily operated stop is produced, which can be conveniently handled, and which can be readily repaired when necessary.

The elastic buffers 34 avoid sudden jar to the parts when the downward movement of the lower plunger and the outer ends of the levers are arrested, as well as avoiding noise.

The charger that carries the clay into the mold is represented by 35, and is moved forward and backward through the medium of cams 36 on the master-wheels, in which rollers 37, on horizontally moving bars 38 have movement. The bars 38 are connected by a cross-piece 39, and they move between grooved guide rollers 40, mounted in boxes 41. Connected to the charger, and to the cross-piece 39, is a screw rod 42, adjustably secured by a nut 43. The arrangement of the parts of the charger moving mechanism is such that the cam 36 in each revolution of the master-wheel causes the charger to move forward, and then backward, during the period that the plungers are removed from the mold, and there is consequently no conflict between the charger and the plungers. I have shown two of the charger moving bars 38, but I do not wish to confine myself to the employment of two bars, it being evident that one bar could be employed effectively, and do the work of the two bars shown.

Other means than the cam 36 might be employed to move the charger, and I do not wish to limit myself to the use of the cam, as a means of moving said charger. For instance, a crank might be employed and accomplish the work as effectively as the means shown.

I claim as my invention—

1. In a brick machine, the combination of a plunger, a lever pivoted to the frame of the machine, and connected to said plunger, a second lever pivoted to the frame of the machine, a link connecting the inner ends of said levers, and a master-wheel having a cam groove engaging the outer end of said second lever; said cam groove passing from near the periphery of the wheel on one side of the center, to near the center of the wheel on the other side of the center, and said parts being so disposed that the point of contact between the lever and cam groove approaches the center of said wheel as the plunger enters the mold; substantially as and for the purpose set forth.

2. In a brick machine, the combination with a master-wheel, a charger, horizontally moving bar or bars connected to said charger, and to said master-wheel, and guide rollers between which said bar or bars move; substantially as and for the purpose set forth.

3. In a brick machine, the combination of the master-wheel, a charger, horizontally moving bars moving between guide rollers, and connected by a screw rod to said charger, a cam on said master-wheel, and a roller on said bars arranged to work in said cam; substantially as and for the purpose set forth.

4. In a brick machine, the combination of a lower plunger, the levers for lifting the lower plunger, and which are pivoted to the frame of the machine, and a stop located forward of the lower plunger and against which the outer ends of the levers impinge; said stop consisting of a fixed frame, a movable frame located within the fixed frame and a screw for adjusting the movable frame, substantially as set forth.

EMIL FERNHOLTZ.

In presence of—
A. M. EBERSOLE,
C. G. EDWARDS.